US009171559B1

(12) United States Patent
Nikolaev et al.

(10) Patent No.: US 9,171,559 B1
(45) Date of Patent: Oct. 27, 2015

(54) SENSOR STRUCTURE WITH PINNED STABILIZATION LAYER

(71) Applicant: Seagate Technology LLC, Cupertino, CA (US)

(72) Inventors: Konstantin Nikolaev, Bloomington, MN (US); Taras Pokhil, Arden Hills, MN (US); Andrzej Stankiewicz, Edina, MN (US); Mohammed Patwari, Eden Prairie, MN (US); Eric Singleton, Maple Plain, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/486,607

(22) Filed: Sep. 15, 2014

(51) Int. Cl.
*G11B 5/39* (2006.01)
*B82Y 25/00* (2011.01)
*B82Y 10/00* (2011.01)

(52) U.S. Cl.
CPC .............. *G11B 5/3932* (2013.01); *B82Y 10/00* (2013.01); *B82Y 25/00* (2013.01); *G11B 2005/3996* (2013.01); *Y10S 977/934* (2013.01); *Y10S 977/943* (2013.01)

(58) Field of Classification Search
CPC .... G11B 2005/3996; G11B 5/33; G11B 5/39; G11B 5/3903; G11B 5/3909; Y10S 977/934; Y10S 977/943; B82Y 25/00; B82Y 10/00

USPC ............................................. 360/324.11, 319
See application file for complete search history.

(56) References Cited

U.S. PATENT DOCUMENTS

| | | | |
|---|---|---|---|
| 6,219,208 B1 | 4/2001 | Gill | |
| 7,145,755 B2 | 12/2006 | Freitag et al. | |
| 7,379,280 B2 | 5/2008 | Fukumoto et al. | |
| 8,659,853 B2 | 2/2014 | Han et al. | |
| 8,711,528 B1 * | 4/2014 | Xiao et al. | 360/324.11 |
| 2002/0006021 A1 | 1/2002 | Beach | |
| 2005/0063105 A1 * | 3/2005 | Pinarbasi | 360/324.11 |
| 2005/0201022 A1 * | 9/2005 | Horng et al. | 360/324.11 |
| 2008/0144234 A1 * | 6/2008 | Lin | 360/324.11 |
| 2009/0257152 A1 * | 10/2009 | Lee et al. | 360/324.11 |
| 2013/0293225 A1 | 11/2013 | Singleton et al. | |
| 2014/0033516 A1 | 2/2014 | Abraham et al. | |
| 2014/0268417 A1 | 9/2014 | Singleton et al. | |

* cited by examiner

*Primary Examiner* — Will J Klimowicz
(74) *Attorney, Agent, or Firm* — HolzerIPLaw, PC (57) ABSTRACT

A reader sensor that has a sensor stack with an AFM layer, a pinned stabilization layer, and a pinned layer, with the pinned stabilization layer closer to the AFM layer than to the pinned layer. The stack also includes a non-magnetic spacer layer between and in contact with the pinned stabilization layer and with the pinned layer. A magnetic coupling between the pinned stabilization layer and the pinned layer is no more than 50% of a magnetic coupling between the pinned stabilization layer and the AFM layer.

18 Claims, 5 Drawing Sheets

SENSOR STRUCTURE WITH PINNED STABILIZATION LAYER

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

One particular implementation described herein is a reader sensor stack having an antiferromagnetic material (AFM) layer, a pinned stabilization layer, a pinned layer, with the pinned stabilization layer closer to the AFM layer than to the pinned layer, a non-magnetic spacer layer between and in contact with the pinned stabilization layer and with the pinned layer, and a reference layer. A magnetic coupling between the pinned stabilization layer and the pinned layer is no more than 50% of a magnetic coupling between the pinned stabilization layer and the AFM layer.

Another particular implementation is a reader sensor stack having an AFM layer, a pinned stabilization layer having a thickness no greater than 2 nm, a pinned layer, with the pinned stabilization layer being closer to the AFM layer than the pinned layer, and a non-magnetic spacer layer between and in contact with the pinned stabilization layer and the pinned layer. The spacer layer provides no more than 0.15 erg/cm$^2$ magnetic coupling between the pinned stabilization layer and the pinned layer.

Yet another particular implementation is a reader sensor stack having an AFM layer, a pinned stabilization layer, a pinned layer, with the pinned stabilization layer between the AFM layer and the pinned layer, and a non-magnetic spacer layer between and in contact with the pinned stabilization layer and with the pinned layer. The pinned stabilization layer has a thickness of no more than 1.5 nm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

There is an increasing demand for high data densities and sensitive sensors to read data from a magnetic media. Giant Magnetoresistive (GMR) sensors commonly consist of three magnetic layers, one of which is a soft magnet, separated by a thin conductive, non-magnetic spacer layer such as copper, from the other magnetic layers. Tunnel Magnetoresistive (TMR) sensors provide an extension to GMR in which the electrons travel perpendicularly to the layers across a thin insulating tunnel barrier.

In general, for these magnetoresistive (MR) sensors, an antiferromagnetic material (AFM) layer (often called the "pinning layer") is placed adjacent to the first magnetic layer to prevent it from rotating. AFM materials exhibiting this property are termed "pinning materials". With its rotation inhibited by the AFM layer, the first layer is termed the "pinned layer" (PL). A soft magnetic layer rotates freely in response to an external field and is called the "free layer" (FL). A coupling spacer layer between the PL and the third magnetic layer, a reference layer (RL), provides an antiferromagnetic coupling (e.g., an RKKY coupling) between them, forming a synthetic antiferromagnetic (SAF) structure. The MR sensor can include other (e.g., non-magnetic) layers.

To operate the MR sensor properly, the sensor is preferably stabilized against the formation of edge domains because domain wall motion results in electrical noise that makes data recovery difficult. A common way to achieve stabilization is with a permanent magnet abutted junction design. In this scheme, permanent magnets with high coercive field (i.e., hard magnets) are placed at each end of the sensor. The field from the permanent magnets stabilizes the sensor and prevents edge domain formation, as well as provides proper bias. Another common way to provide the free layer bias is to use stabilized soft magnetic layers in place of the permanent magnets. The use of the AFM allows for consistent and predictable orientation of the SAF structure. Furthermore, the use of the SAF structure stabilized by the AFM layer enables high amplitude linear response for a reader using the MR sensor.

During operation of the MR sensor, individual AFM grains may reorient their magnetic orientation, leading to degraded reader stability and possibly to sensor error. A reduction of the exchange coupling at the AFM/PL interface may increase the reader stability by reducing the effect of the AFM grain reorientation, as long as sensor polarity is maintained. A decreased coupling at the AFM/PL interface lowers the reader's sensitivity to any AFM-induced instabilities and to any effects of magnetic dispersion that are inherently present in the AFM layer. However, one relies on the interface exchange to magnetically align the AFM grains during the high-temperature setting anneal process. As-deposited, the individual grains in the AFM layer are randomly oriented in the film plane. During the annealing process, the grains are magnetically oriented by the torque provided by the adjacent PL, which follows the external magnetic field applied during the process. However, a weaker exchange between the AFM layer and the PL increases the energy barrier for the grain to orient and, as a consequence, leads to higher AFM dispersion. This higher dispersion may induce SAF/AFM instabilities and, in certain cases, result in the appearance of parts with opposite polarity.

An example sensor assembly disclosed herein provides a sensor stack design that combines good AFM grain setting while providing a weaker coupling to the SAF structure. The strength of coupling to the SAF structure is controllable and can be tuned to achieve a desired (e.g., optimal) sensor operation point. In addition to lowering the sensitivity to AFM-induced instabilities (e.g., reorientation of the magnetic orientation of a grain), this sensor stack design reduces the probability of the occurrence of these events, and improves stability of pinning against subsequent thermal anneals.

Specifically, the sensor assembly includes a reader "stack" having a pinned stabilization layer adjacent to and coupled to the AFM layer, and a non-magnetic spacer between the pinned stabilization layer and the PL. The spacer controls the coupling between the pinned stabilization layer and the PL, and provides a mechanism to reduce the effective coupling between the AFM layer and the PL, which in turn reduces the probability of transferring an instability from the AFM to the PL, and consequently, to the RL.

It is noted that in structures without a pinned stabilization layer, one would normally call a layer a "pinned layer" or PL when it is immediately next to an AFM layer that pins its magnetization. However, in this disclosure, the magnetic layer of the SAF structure closest to the AFM, even though it is only weakly coupled to the AFM (via the pinned stabilization layer) is nevertheless referred to as a "pinned layer" or PL.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
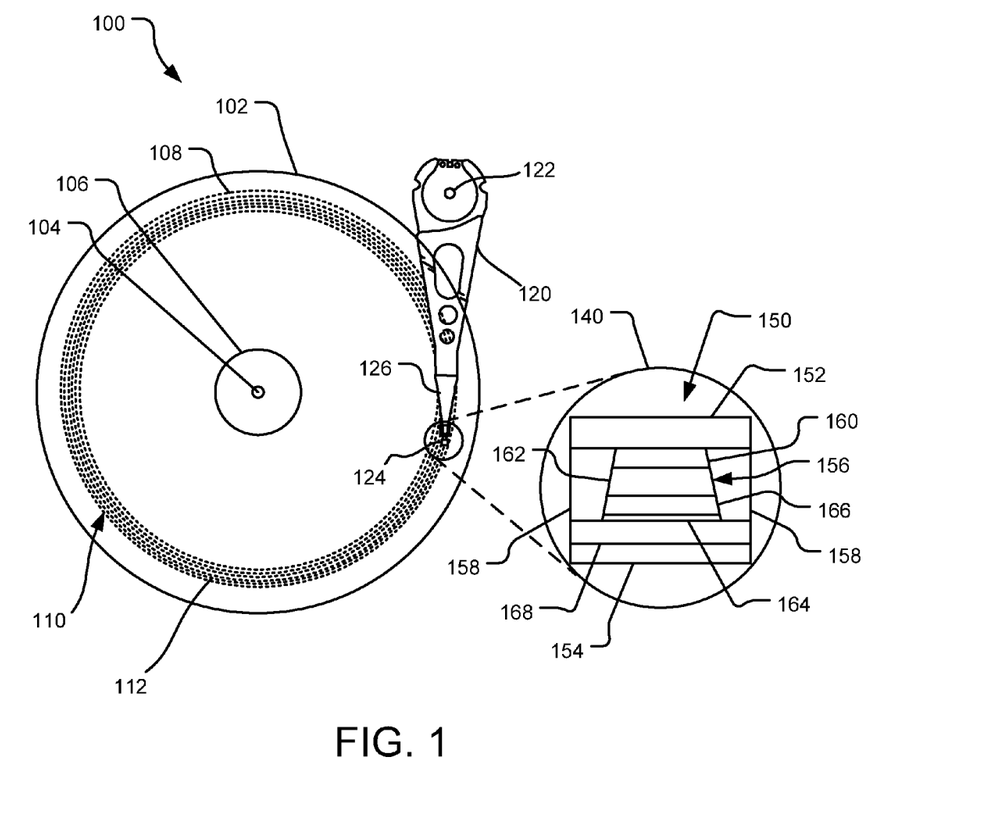
FIG. 1 is a perspective view of an example recording device using a reader having a sensor structure disclosed herein.

FIG. 1 illustrates a perspective view of an example recording device 100 (e.g., a disc drive assembly 100) using a reader disclosed herein. Recording device 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced patterned bits 112, indicated as dots or ovals on the disc 102. It should be understood, however, that the described technology may be employed with various types of storage media, including continuous magnetic media, discrete track (DT) media, etc.

Information may be written to and read from the bits 112 on the disc 102 in different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

An exploded view 140 illustrates an expanded view of a portion of the transducer head 124, with a reader sensor 150 illustrated by a schematic block diagram that illustrates an air-bearing surface (ABS) view of the reader sensor 150. That is, the exploded view 140 illustrates a portion of the transducer head 124 that faces the ABS of the disc 102 when the disc drive assembly 100 is in use. Thus, the reader sensor 150 shown in the exploded view 140 may be rotated by about 180 degrees about an axis (e.g., about a z-axis) when operationally attached to the transducer head 124. It is noted that the reader sensor 150 in the exploded view 140 is not necessarily illustrated with accurate dimensions and/or all of its elements, but rather, the pertinent features of the reader sensor 150, relevant to the current disclosure, are shown.

In the illustrated implementation, the reader sensor 150 is illustrated to include a top shield structure 152 and a bottom shield 154, with a sensor stack 156 between the shields 152, 154 along the down-track direction of the reader sensor 150. The top shield structure 152 and the bottom shield 154 protect the sensor stack 156 from flux from adjacent data tracks 110 on the disc 102. Top shield structure 152 provides stabilization to side shields 158 that are placed between the top shield 152 and the bottom shield 154, bounding the sensor stack 156 in the cross-track direction.

Although not shown in detail nor with relative dimensions in the exploded view 140, sensor stack 156 includes multiple layers, including a free layer 160 that has a switchable magnetic orientation. The sensor stack 156 also includes a synthetic antiferromagnetic (SAF) structure 162, a pinned stabilization layer 164, and a non-magnetic spacer layer 166 between the SAF structure 162 and the pinned stabilization layer 164. An antiferromagnetic (AFM) layer 168 is between the bottom shield 154 and the pinned stabilization layer 164. Not shown, a seed layer may be present between the bottom shield 154 and the AFM layer 168.

Not seen in the exploded view 140, the SAF structure 162 includes at least a reference layer and a pinned layer with a spacer layer therebetween, with the pinned layer being adjacent to the spacer layer 166. The sensor stack 156 thus has two pinned layers, the pinned stabilization layer 164 adjacent to the AFM layer 168 and the pinned layer in the SAF structure 162, with the non-magnetic spacer layer 166 therebetween.

The pinned stabilization layer 164 is a thin (i.e., less than 5 nm thick) layer having a pinned magnetization. The pinned stabilization layer 164 is in physical contact with and magnetically coupled to the AFM layer 168. The high exchange coupling at the interface of the AFM layer 168 and the pinned stabilization layer 164 enables adequate magnetic setting of the grains of the material forming the AFM layer 168 during an anneal process used in the forming of the reader sensor 150.

Figure 2A:
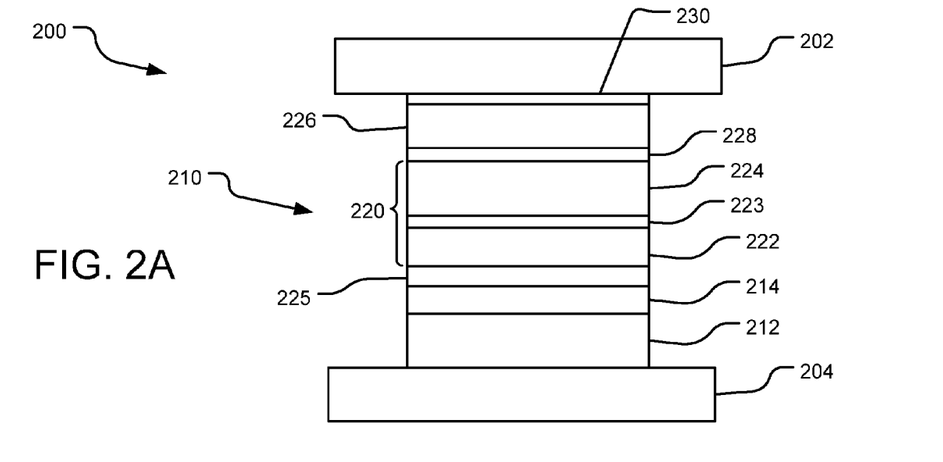
FIG. 2A is a schematic of an air-bearing surface (ABS) view of an example reader sensor structure.
Figure 2B:
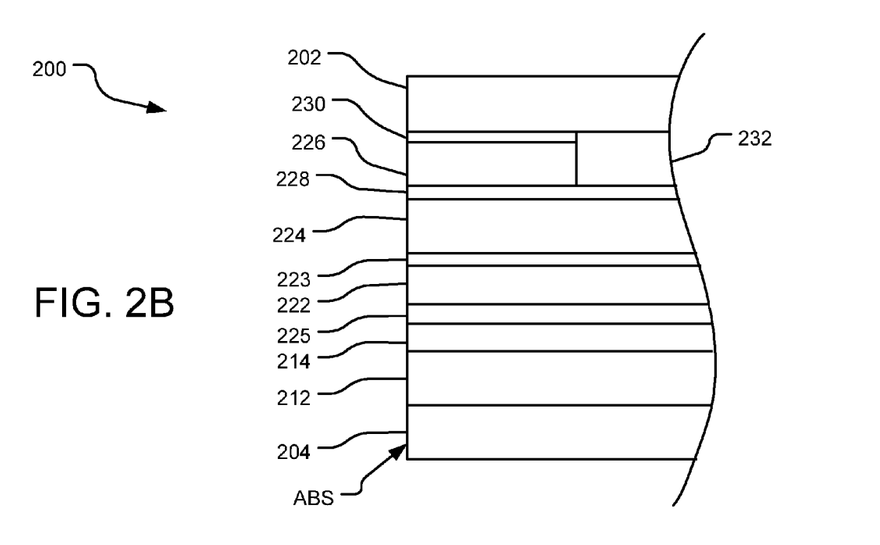
FIG. 2B is a schematic of a cross-section view taken orthogonal to the ABS of the example reader sensor structure.

FIG. 2A illustrates an ABS view of an example implementation of a sensor structure having a pinned stabilization layer between another pinned layer and an AFM layer, and FIG. 2B is a view orthogonal to the ABS view of FIG. 2A. In FIGS. 2A and 2B, a reader 200 includes a top shield structure 202 and a bottom bulk shield 204 on two opposite sides (along the down-track direction) of a sensor stack 210 that has multiple layers. Not illustrated in this figure but seen in FIG. 1, side shields are present around the sensor stack 210 in the cross-track or lateral direction, between the top shield structure 202 and the bottom shield 204. In the illustrated implementation, the side shields would encompass all of the layers of the sensor stack 210; in other implementations, for example, the side shields may not encompass one or more layers.

Proximate bottom bulk shield 204, the sensor stack 210 includes an AFM layer 212. Not shown, a seed layer may be present between the bottom shield 204 and the AFM layer 212. Sensor stack 210 has a pinned stabilization layer 214 adjacent to and in contact with the AFM layer 212, and also a SAF structure 220 composed of a pinned layer (PL) 222, a reference layer (RL) 224 and a spacer layer 223 therebetween. The SAF structure 220 is arranged with the pinned layer 222 closer to the pinned stabilization layer 214 than the reference layer 224. A spacer layer 225 is present between and in contact with both the pinned stabilization layer 214 and the SAF structure 220. A free layer (FL) 226, which has a switchable magnetization orientation, is proximate to the reference layer 224 of the SAF structure 220, with a barrier layer 228 between the free layer 226 and the reference layer 224. Also shown is a capping layer 230 and an isolation layer 232.

The particulars of the specific construction of the reader sensor 200 are not of particular relevance to the pinned stabilization layer 214 in the reader sensor 200, and a detailed discussion of the other elements of the reader sensor 200 is not provided herein. Unless indicated otherwise, the various layers of the reader sensor 200 are made from materials commonly used for those elements.

The magnetization of the pinned layer 222 in the SAF structure 220 is stabilized, to a certain extent, by the AFM layer 212. However, due to the presence of the pinned stabilization layer 214 and the spacer layer 225, the coupling is reduced, compared to if no pinned stabilization layer 214 and spacer layer 225 were present. This reduced coupling decreases the probability of transferring an instability from the AFM layer 212 to the pinned layer 222.

As indicated above, the pinned stabilization layer 214 is a thin (i.e., no greater than 5 nm thick) layer having a pinned magnetization. In some implementations, the pinned stabilization layer 214 has a thickness no greater than 2 nm, in other embodiments no greater than 1.5 nm, and yet in other embodiments no greater than 1 nm. An example range for thicknesses of the pinned stabilization layer 214 is 0.5 to 1.5 nm. As a comparison, the pinned layer 222 typically has a thickness in the range of about 1.5 to 4 nm. The pinned stabilization layer 214 may be formed of the same or different material than the pinned layer 222.

The spacer layer 225 between the pinned stabilization layer 214 and the pinned layer 222 enables the magnetic coupling (either ferromagnetic or antiferromagnetic coupling) between the pinned stabilization layer 214 and the pinned layer 222. The spacer layer 225 is formed from a non-magnetic, electrically conductive material.

The magnetic coupling between the pinned stabilization layer 214 and the pinned layer 222 is less than the coupling between the AFM layer 212 and the pinned stabilization layer 214, and less than the SAF coupling between the pinned layer 222 and the reference layer 224. In many implementations, the coupling (per unit area) between the AFM layer 212 and the pinned stabilization layer 214 is comparable to the SAF coupling. The magnetic coupling between the pinned stabilization layer 214 and the pinned layer 222 can be as much as 10-20 times less than the lesser of the other two couplings (i.e., between the AFM layer 212 and the pinned stabilization layer 214, and between the pinned layer 222 and the reference layer 224). The role of the magnetic coupling between the pinned stabilization layer 214 and the pinned layer 222 is to maintain the desired magnetic orientation of the SAF structure 220 of the reader 200.

In some implementations, the magnetic coupling between the pinned stabilization layer 214 and the pinned layer 222 is no more than 50% of the magnetic coupling between the pinned stabilization layer 214 and the AFM layer 212. In some implementations, the magnetic coupling between the pinned stabilization layer 214 and the pinned layer 222 is no more than 50% of the magnetic coupling between the pinned layer 222 and the reference layer 224. That is, the spacer layer 225 reduces the magnetic coupling by at least half of one of the other two couplings. In some implementations, the coupling is reduced by at least 65%, or by at least 75%, or by at least 80%, or by at least 85%, or by at least 90% or even 95%; such reductions result in the coupling between the pinned stabilization layer 214 and the pinned layer 222 being no more than 35%, or no more than 25%, or no more than 20%, or no more than 15%, or no more than 10% or even no more than 5% of the coupling between the pinned stabilization layer 214 and the AFM layer 212 or the pinned layer 222 and the reference layer 224, typically the lesser of the two.

In some implementations, the spacer layer 225 is formed of a material that supports RKKY coupling between the pinned stabilization layer 214 and the pinned layer 222. Examples of materials that support RKKY coupling, and would be suitable for the spacer layer 225, include ruthenium (Ru), iridium (Ir), and rhodium (Rh); these and other materials can provide ferromagnetic or antiferromagnetic RKKY coupling as a function of the thickness of the material layer. In other implementations, the coupling may be roughness-induced. The coupling between the pinned stabilization layer 214 and the pinned layer 222 can be either ferromagnetic or antiferromagnetic.

The pinned layer 222 is coupled (either ferromagnetically or antiferromagnetically) to the pinned stabilization layer 214 via the non-magnetic spacer layer 225. As discussed above, this coupling can be of RKKY origin or can be roughness-induced. The magnitude and sign (i.e., positive (ferromagnetic) or negative (antiferromagnetic)) of the coupling can be controlled by the selection of the materials and thicknesses of the pinned stabilization layer 214, the pinned layer 222 and the spacer layer 225. In some implementations, the coupling between the pinned stabilization layer 214 and the pinned layer 222 is no more than 0.15 erg/cm$^2$, in other implementations no more than 0.1 erg/cm$^2$, and in yet others no more than 0.05 erg/cm$^2$. In some implementations, the coupling between the pinned stabilization layer 214 and the pinned layer 222 is 0.01-0.1 erg/cm$^2$, and in others 0.02-0.05 erg/cm$^2$.

A very thin pinned stabilization layer 214 is desired (e.g., less than 1.5 nm, or less than 1 nm) for various reasons. First, a thin layer 214 is desired because the thickness of every layer contributes to net shield-to-shield spacing (SSS) (i.e., the spacing between the top shield 202 and the bottom shield 204), it is desired is to maintain a low SSS in order to achieve high linear density capability of the reader sensor 200. Second, during processing of the sensor 200, while a high field setting anneal does saturate the magnetization of a very thin stabilization layer 214, subsequent lower field lower temperature anneals do not perturb it; this helps preserve the magnetic orientation of the AFM grains achieved during the stack anneal (i.e., the high field setting anneal) and widens the processing options for subsequent anneals. Third, by having the pinned stabilization layer 214 present, the stability of the AFM grains is improved due to the reduced destabilizing torque provided by the thin pinned stabilization layer, compared to a pinned layer without a pinned stabilization layer. For a thick pinned layer (usually 1.5 to 4 nm thick), the magnetization is relatively uniform; the torque exerted on an AFM grain that is oriented close to perpendicular to the direction of pinning is high and the barrier for switching is low. Conversely, magnetization of a very thin pinned layer, to a large degree, follows the local magnetic order of any individual AFM grain, and does not destabilize this grain.

Although the sensor 200 includes two additional layers (i.e., the pinned stabilization layer 214 and the spacer layer 225) over other sensors without these layers, it is possible to reduce the thickness of the SAF structure 220 to compensate for the increased SSS due to the two additional layers. Because the SAF structure 220 is only weakly coupled to the AFM layer 212, the thickness of the SAF structure 220 can be reduced; in a sensor without the two additional layers (i.e., the pinned stabilization layer 214 and the spacer layer 225), the pinned layer 222 and the reference layer 224 are thicker due to the need to suppress the dispersion originating at the AFM layer 212.

Figure 3:
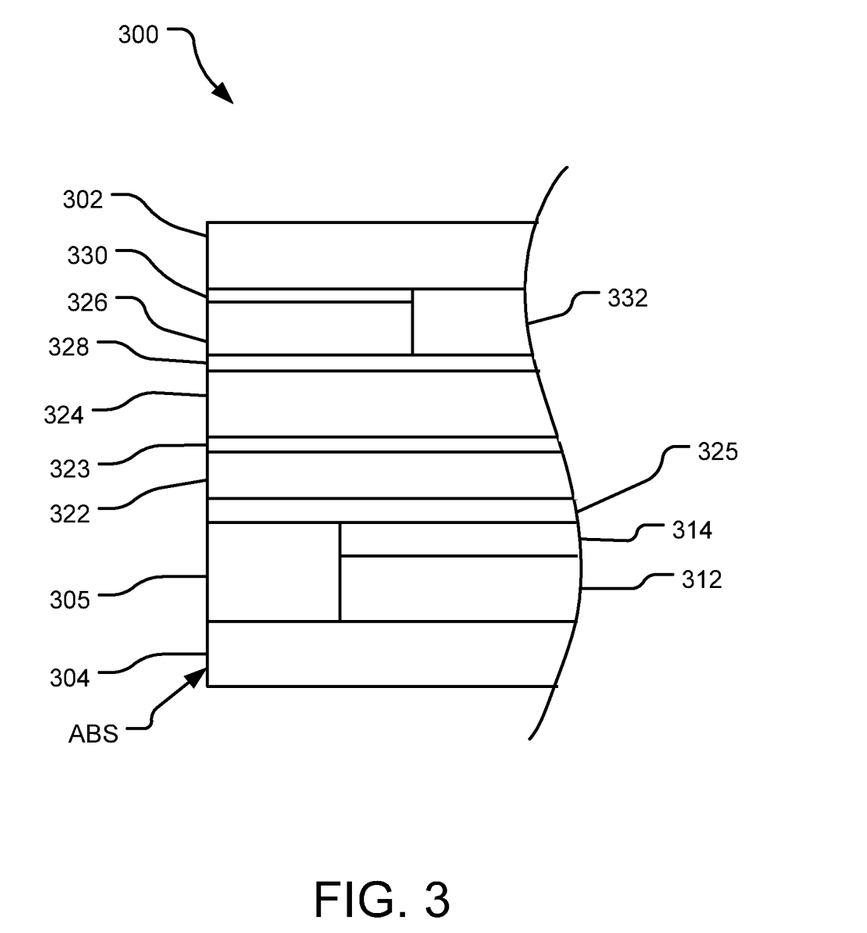
FIG. 3 is a schematic of a cross-section view taken orthogonal to the ABS of another example reader sensor structure.

FIG. 3 illustrates another schematic block diagram of a view orthogonal to the ABS view of an example implementation of a sensor structure having a pinned stabilization layer between another pinned layer and an AFM layer. Unless indicated otherwise, the elements of FIG. 3 are the same as or similar to like elements of FIGS. 2A and 2B.

A reader 300 includes a top shield structure 302 and a bottom bulk shield 304. Proximate bottom bulk shield 304 is an AFM layer 312; AFM layer 312 is recessed from the ABS and as such does not contribute to an effective SSS. The recess or area voided by the recessed AFM layer 312 has a front shield 305. Not shown, a seed layer may be present between the bottom shield 304 and the AFM layer 312. A pinned stabilization layer 314 is adjacent to and in contact with the AFM layer 312; pinned stabilization layer 314 is also recessed from the ABS, and as such does not contribute to an effective SSS. The recess or area voided by the pinned stabilization layer 314 has a front shield 305. Reader 300 also has a pinned layer (PL) 322, a reference layer (RL) 324 and a spacer layer 323 therebetween. A spacer layer 325 is present between and in contact with both the pinned stabilization layer 314 and the pinned layer 322. A free layer (FL) 326, which has a switchable magnetization orientation, is proximate to the reference layer 324, with a barrier layer 328 between the free layer 326 and the reference layer 324. Also shown is a capping layer 330 and an isolation layer 332.

Figure 4A:
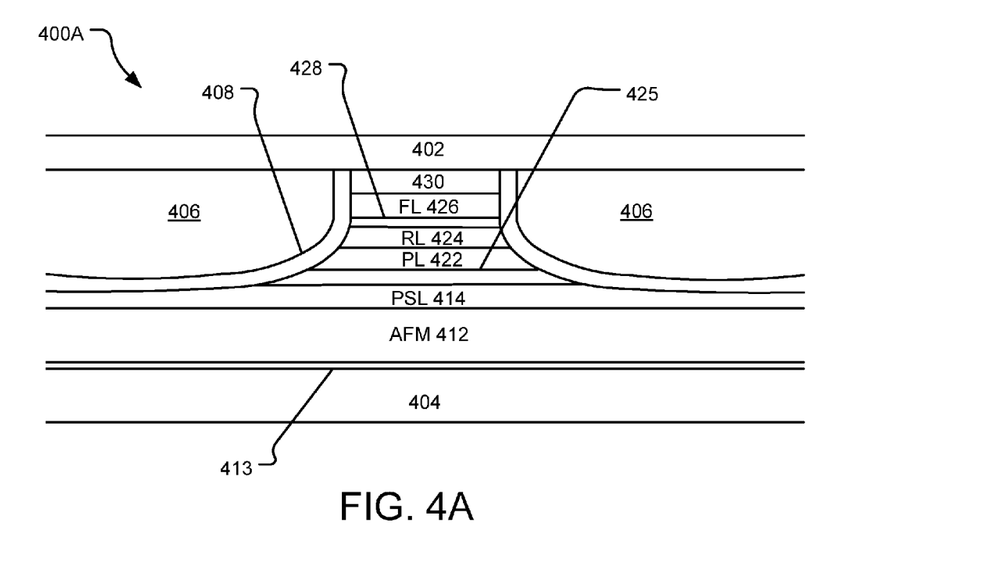
FIG. 4A is an alternate schematic of an ABS view of an example reader sensor structure.
Figure 4B:
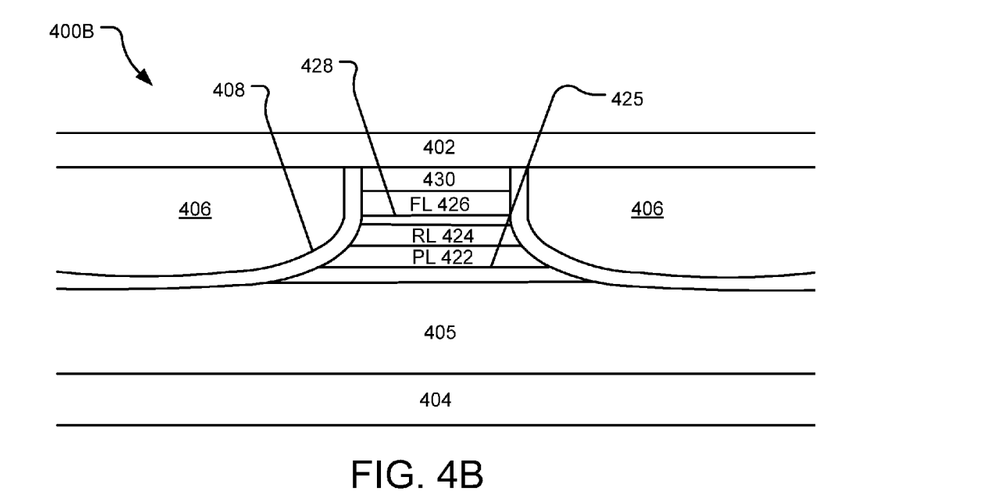
FIG. 4B is another alternate schematic of an ABS view of an example reader sensor structure.

FIGS. 4A and 4B illustrate two other schematic block diagram of an ABS view of example implementations of sensor structures having a pinned stabilization layer between another pinned layer and an AFM layer. Unless indicated otherwise, the elements of FIG. 4A are the same as or similar to like elements of FIGS. 2A, 2B and the elements of FIG. 4B are the same as or similar to the like elements of FIG. 3.

In both FIGS. 4A and 4B, a reader 400A, 400B, respectively, includes a top shield structure 402 and bottom bulk shield 404 on two opposite sides (along the down-track direction) of a sensor stack that has multiple layers. Reader 400A, 400B includes side shields 406 on either side of the multi-layer sensor stack in the cross-track or lateral direction, between the top shield structure 402 and the bottom shield 404. In the illustrated implementation, the side shields 406 encompass some, but not all, of the layers of the multi-layer sensor stack. A junction isolation layer 408 insulates the side shields 406 from the layers of the sensor stack.

In FIG. 4A, for reader 400A, proximate bottom bulk shield 404, the sensor stack includes an AFM layer 412 (AFM 412) and a seed layer 413 between the bottom shield 404 and the AFM layer 412. The sensor stack also has a pinned stabilization layer 414 (PSL 414) adjacent to and in contact with the AFM layer 412.

Reader 400B in FIG. 4B also includes an AFM layer and a seed layer between the bottom shield 404 and the AFM layer. The sensor stack also has a pinned stabilization layer adjacent to and in contact with the AFM layer. However, in this implementation, the seed layer, the AFM layer, and the pinned stabilization layer are recessed from the ABS and hidden or otherwise blocked from the ABS view by a front shield 405.

Both readers 400A, 400B also have a pinned layer 422 (PL 422), a reference layer 424 (RL 424) and a spacer layer (not shown) between the pinned layer 422 and the reference layer 424. The pinned layer 422 is closer to the pinned stabilization layer 414 than the reference layer 424. A spacer layer 425 is present between and in contact with both the pinned stabilization layer 414 and the pinned layer 422. A free layer 426 (FL 426), which has a switchable magnetization orientation, is proximate to the reference layer 424, with a barrier layer 428 between the free layer 426 and the reference layer 424. Also shown is a capping layer 430.

The pinned layer 422 is coupled (either ferromagnetically or antiferromagnetically) to the pinned stabilization layer 414 via the non-magnetic spacer layer 425. The spacer layer 425 between the pinned stabilization layer 414 and the pinned layer 422 provides the magnetic coupling (either ferromagnetic or antiferromagnetic coupling) between the pinned stabilization layer 414 and the pinned layer 422. The magnitude and sign (i.e., positive (ferromagnetic) or negative (antiferromagnetic)) of the coupling can be controlled by the selection of the materials and thicknesses of the pinned stabilization layer 414, the pinned layer 422 and the spacer layer 425.

All of the read sensors described above, e.g., readers 150, 200, 300, 400A, 400B and variations thereof, and sensor stacks described above, e.g., stacks 156, 210, and variations thereof, can be fabricated by a combination of various methods, including plating, sputtering, vacuum deposition, etching, ion milling, and other deposition and processing techniques.

Figure 5:
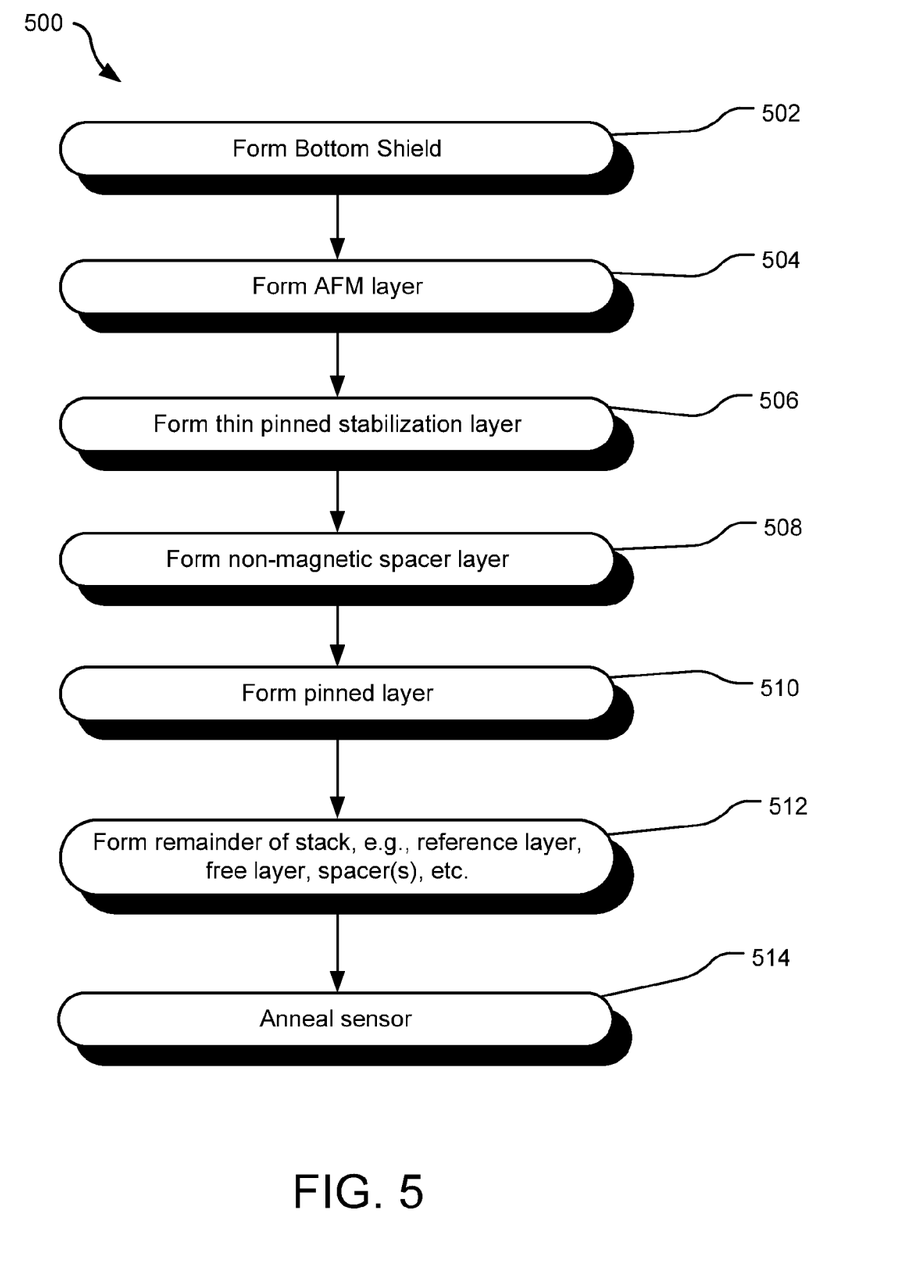
FIG. 5 is a flowchart illustrating an example method of forming an example reader sensor structure.

In reference to FIG. 5, a flowchart illustrates an example method 500 for forming a read sensor having a sensor stack with a pinned stabilization layer and non-magnetic spacer layer between another pinned layer and an AFM layer. The method involves operation 502 of forming a bottom shield layer on a substrate. This operation does not require forming the bottom shield directly on the substrate, as intervening materials/layers may be present between the bottom shield and substrate. A sensor stack is formed on the bottom shield in operations 504 through 512. This operation does not require forming the sensor stack directly on the shield, as intervening materials/layers (e.g., a seed layer) may be present between the bottom shield and sensor stack. In operation 504, an antiferromagnetic layer (AFM) is formed. Directly on and in contact with the AFM layer, a pinned stabilization layer, having a thickness of no more than 5 nm, is formed in operation 506. A non-magnetic spacer layer is formed in operation 508 directly on and in contact with the pinned stabilization layer, and a pinned layer is formed directly on and in contact with the non-magnetic spacer layer in operation 510. The remainder of the sensor stack is formed in operation 512, which includes forming layers such as a reference layer, a free layer, one or more spacer or barrier layers, and other layers. Any or all of operations 504 through 512 can be done in a single (e.g., deposition) step, or any number of the operations 504 through 512 may be combined; intervening operations may be present between any of the operations. For example, for sensor stacks having a recessed AFM layer and recessed pinned stabilization layer, operations 504 and 506 may be done as a single step, then a front shield can be defined, after which operations 508, 510 and 512 are done as a single step.

After formation of the sensor stack, the reader sensor may be annealed in operation 514 under high temperature in the presence of a magnetic field.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A reader sensor stack comprising:
   an AFM layer;
   a pinned stabilization layer having a thickness no greater than 1.5 nm and magnetically coupled to the AFM layer;
   a pinned layer, with the pinned stabilization layer closer to the AFM layer than the pinned layer;
   a non-magnetic spacer layer between and in contact with the pinned stabilization layer and with the pinned layer; and
   a reference layer antiferromagnetically coupled to the pinned layer,
   wherein a magnetic coupling between the pinned stabilization layer and the pinned layer is no more than 50% of the magnetic coupling between the pinned stabilization layer and the AFM layer.

2. The reader sensor stack of claim 1, wherein the magnetic coupling between the pinned stabilization layer and the pinned layer is no more than 35% of the magnetic coupling between the pinned stabilization layer and the AFM layer.

3. The reader sensor stack of claim 1, wherein the pinned stabilization layer is adjacent to and in contact with the AFM layer.

4. The reader sensor stack of claim 1, wherein the non-magnetic spacer layer enables RKKY coupling.

5. The reader sensor stack of claim 1, wherein the non-magnetic spacer layer comprises Ru, Ir, Rh or Ta.

6. The reader sensor stack of claim 1, wherein the pinned stabilization layer has a thickness of no more than 1 nm.

7. The reader sensor stack of claim 1, wherein the pinned stabilization layer has a thickness in the range of 0.5 to 1.5 nm.

8. A reader sensor stack comprising:
   an AFM layer;
   a pinned stabilization layer having a thickness no greater than 1.5 nm and magnetically coupled to the AFM layer;
   a pinned layer, with the pinned stabilization layer being closer to the AFM layer than the pinned layer; a reference layer antiferromagnetically coupled to the pinned layer; and
   a non-magnetic spacer layer between and in contact with the pinned stabilization layer and with the pinned layer, the spacer layer providing no more than 0.15 erg/cm$^2$ magnetic coupling between the pinned stabilization layer and the pinned layer.

9. The reader sensor stack of claim 8, wherein the pinned stabilization layer is adjacent to and in contact with the AFM layer.

10. The reader sensor stack of claim 8, wherein the non-magnetic spacer layer has RKKY coupling properties.

11. The reader sensor stack of claim 8, wherein the spacer layer comprises Ru, Ir, Rh, or Ta.

12. The reader sensor stack of claim 8, wherein the pinned stabilization layer has a thickness in the range of 0.5 to 1.5 nm.

13. The reader sensor stack of claim 8, wherein the pinned stabilization layer has a thickness of no more than 1 nm.

14. The reader sensor stack of claim 8, wherein the spacer layer provides no more than 0.1 erg/cm$^2$ magnetic coupling between the pinned stabilization layer and the pinned layer.

15. A reader sensor stack comprising:
   an AFM layer;
   a pinned stabilization layer magnetically coupled to the AFM layer;
   a pinned layer, with the pinned stabilization layer between the AFM layer and the pinned layer; a reference layer antiferromagnetically coupled to the pinned layer;
   a non-magnetic spacer layer between and in contact with the pinned stabilization layer and with the pinned layer,
   wherein the pinned stabilization layer has a thickness of less than 1.5 nm and the pinned layer has a thickness greater than 1.5 nm, and the pinned stabilization layer and the pinned layer have a magnetic coupling therebetween of no more than 0.15 erg/cm$^2$.

16. The reader sensor stack of claim 15, wherein the non-magnetic spacer layer enables RKKY coupling.

17. The reader sensor stack of claim 16, wherein the spacer layer comprises Ru, Ir, or Rh.

18. The reader sensor stack of claim 15, wherein the AFM layer and the pinned stabilization layer are recessed from an air-bearing surface of the reader sensor stack.

* * * * *